(12) United States Patent
Guyot

(10) Patent No.: US 6,289,560 B1
(45) Date of Patent: Sep. 18, 2001

(54) BINDING CLIP

(75) Inventor: Robert Guyot, Chateauroux (FR)

(73) Assignee: Eurostyle (S.A.S), Verrieres Le Buisson (FR)

( * ) Notice: Subject to any disclaimer, the term of this patent is extended or adjusted under 35 U.S.C. 154(b) by 0 days.

(21) Appl. No.: 09/446,026

(22) PCT Filed: Apr. 16, 1999

(86) PCT No.: PCT/FR99/00896

§ 371 Date: May 3, 2000

§ 102(e) Date: May 3, 2000

(87) PCT Pub. No.: WO99/54633

PCT Pub. Date: Oct. 28, 1999

(30) Foreign Application Priority Data

Apr. 17, 1998 (FR) .................................................. 98 04823

(51) Int. Cl.$^7$ .................................................. F16B 5/06
(52) U.S. Cl. .................................................. 24/297
(58) Field of Search ........................... 24/297, 453, 305; 411/508–510, 913; 174/138 D; 403/406.1, 408.1

(56) References Cited

U.S. PATENT DOCUMENTS

| 3,577,603 | * | 5/1971 | Heath et al. . | |
|---|---|---|---|---|
| 3,704,486 | * | 12/1972 | Blacklock . | |
| 3,852,849 | | 12/1974 | Pestka | 24/73 |
| 3,860,999 | * | 1/1975 | Meyer . | |
| 4,430,776 | | 2/1984 | Shimizu et al. | 24/573 |
| 4,575,060 | * | 3/1986 | Kitagawa . | |
| 4,701,984 | | 10/1987 | Wyckoff | 24/573 |
| 4,715,095 | * | 12/1987 | Takahashi . | |
| 5,172,999 | * | 12/1992 | Ijima et al. . | |
| 5,542,158 | | 8/1996 | Gronau et al. | 24/295 |
| 5,669,731 | * | 9/1997 | Hironaka et al. . | |
| 5,988,678 | * | 11/1999 | Nakamura et al. . | |

FOREIGN PATENT DOCUMENTS

| 39 05 688 A1 | 8/1990 | (DE) . |
|---|---|---|
| 10-44882 | * 2/1998 | (JP) . |

* cited by examiner

Primary Examiner—James R. Brittain
(74) Attorney, Agent, or Firm—Duane Morris & Heckscher, LLP

(57) ABSTRACT

A clip for mounting a thermoplastic part on a support, the clip integrated with the part having a body extended by a nose carrying rims for snap-fastening on the support, ribs coming into abutment against the outside surface of the support.

8 Claims, 3 Drawing Sheets

BINDING CLIP

The present invention relates to an integrated fastener or fastening clip intended particularly but not exclusively for fixing parts made of thermoplastic material and provided with such fasteners onto metal parts, in particular in motor manufacture.

BACKGROUND OF THE INVENTION

Traditionally, such fastenings are made by means of discrete fitted elements such as rivets, plastics material fasteners, or screws where the thread engages in a hole or opening in the support while the head holds captive the plastics part that is to be fixed thereto. Although that kind of assembly is easy to disassemble, it is expensive because it leads to making additional tooling. Furthermore, such fastening by means of discrete fitted elements costs a great deal of labor time.

OBJECTS AND SUMMARY OF THE INVENTION

An object of the present invention is to mitigate that drawback and to enable fixing to be performed instantly and blind, and also to provide fixing that is capable of being taken apart without destroying or spoiling the surfaces that come into contact with the metal support. The invention can also be used for clipping parts onto supports that are not made of metal but that do have sharp edges.

Independent clips have already been proposed.

U.S. Pat. No. 4,701,984 describes a clip made of plastics material for fixing a printed circuit inside a metal box. Its body comprises a fixing portion for inserting into a polygonal opening and a holding portion which keeps the printed circuit at a distance from the wall of the box. The printed circuit is thus clamped between the head and the holding portion.

In U.S. Pat. No. 5,542,148, the two parts to be united are assembled together by means of a metal spring snapped into a flexible housing and pressing laterally against said housing.

A second object of the invention is to enable a thermoplastic part to be fixed in leakproof manner on a support.

The integrated clip for fixing a thermoplastic part onto a support, in particular a metal support, is integrated in said part by being molded therewith. As a result, the integrated clip is entirely suitable for recycling without taking precautions to remove a fitted element for subsequent sorting. Thermoplastic parts, in particular for cars, are made by injection, and the clips can thus be obtained directly merely at the cost of making the mold slightly more complicated. The invention thus avoids providing housings for receiving fitted clips which would give rise to assembly costs.

According to the invention, an integrated plastics material clip for fixing a part on a support, in particular a support made of metal, comprises a hollow body terminated at one of its ends by a nose of dimensions that are smaller than those of the body, and at least one substantially triangular snap-fastening rim projecting from the nose to define a snap-fastening zone that is to receive the edge of the support by elasticity and to hold the integrated clip in the support.

The flexibility of the plastics material enables the nose of the integrated clip to be inserted into the orifice and enables the projecting rims to be retracted until the clip occupies a predefined position in which the metal sheet, or more generally the support, is clamped between the body of the integrated clip and the snap-fastening rims.

According to another characteristic of the invention, a spacer interconnects the two sides of the nose and the side walls of the body, thereby forming a cross plate.

According to another characteristic of the invention, two side bearing ribs serve as abutments for the integrated clip on the support.

The sides constituting the nose of the clip are of increasing thickness and consequently flexible, and they can be assembled and disassembled in openings having respective surrounding flanges formed directly in the sheet metal, and they make this possible without the quality and the state of the snap-fastening rims being degraded. It is commonplace, that in general the edges of cutouts are sharp and that consequently direct insertion of the integrated clip would damage specifically the snap-fastening rims, so that the leakproofing and the quality of fixing deteriorates after a few assembly and disassembly operations.

In accordance with the invention, the support having surrounding flanges enables the positions of the sharp zones to be changed. The sides of the V-shaped nose can thus slide over the edges of the support without being damaged, and they enable the nose to take up its final position.

Such parts are disassembled only occasionally, when specific problems arise. The thermoplastic material constituting the integrated clip is therefore selected in such a manner as to be suitable for surviving a score of assembly and disassembly operations.

BRIEF DESCRIPTION OF THE DRAWINGS

Other characteristics and advantages of the present invention will appear on reading the following description of a particular embodiment, given purely by way of non-limiting example, and with reference to the figures, in which.

MORE DETAILED DESCRIPTION

Figure 1:
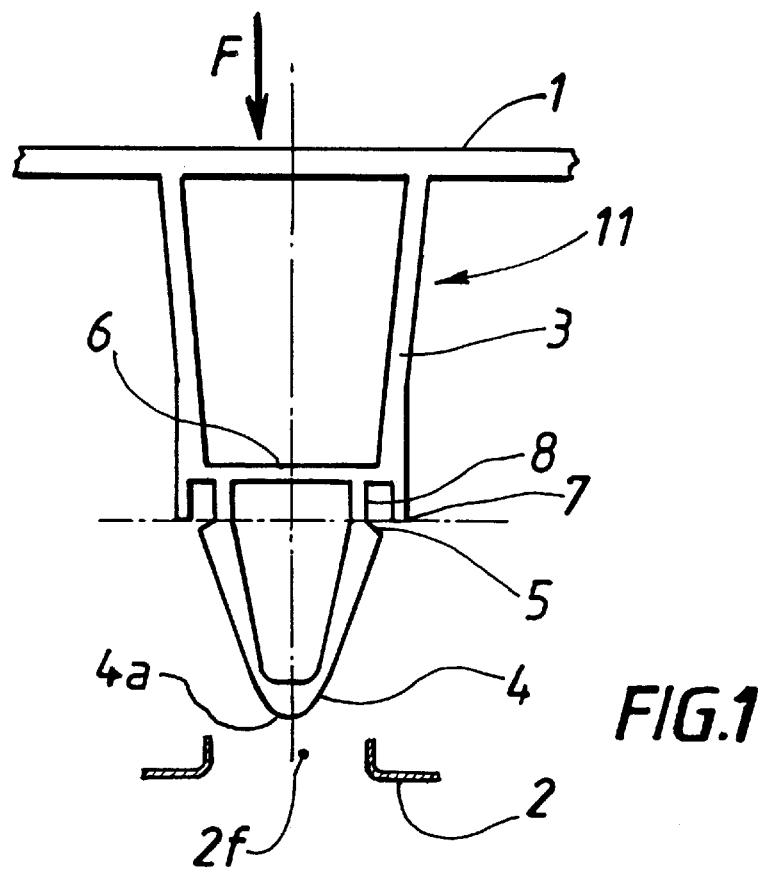
FIGS. 1 to 4 show the various positions of the portions of the integrated clip while it is being inserted and fixed in a cutout.

In FIGS. 1 to 6, the same references are used to designate the same elements. The purpose of the integrated clip is to fix a part 1, e.g. made of thermoplastic material, onto a support 2, e.g. made of metal, and having a cutout 2*f* which, in the example shown, is rectangular. An integrated clip given overall reference 11 projects from the part 1 towards the support 2, the clip comprising a hollow body constituted by two sloping trapezoidal faces, the body 3 terminating at its leading end in a cross plate 6 interconnecting the two faces of the body 3 and from which there projects a V-shaped nose 4 of width that is smaller than the width of the sides of the body 3.

Snap-fastening rims 5 are formed on the sides of the trailing portion of the nose 4, these rims being constituted by substantially triangular walls that form a snap-fastening zone 8 immediately after the rims 5. The V-shaped nose 4 serves to center and direct the clip until it takes up the position shown in FIG. 2, thus making it possible to assemble the part blind, i.e. without having to seek out its proper position.

FIG. 1 shows the part 1 and the support 2 before the integrated clip 11 penetrates into the cutout or opening 2*f* in the direction of arrow F. In the description below, it is assumed that the support remains stationary and that the integrated clip moves relative to the support. Naturally, all that is required is relative movement between the parts.

Figure 2:
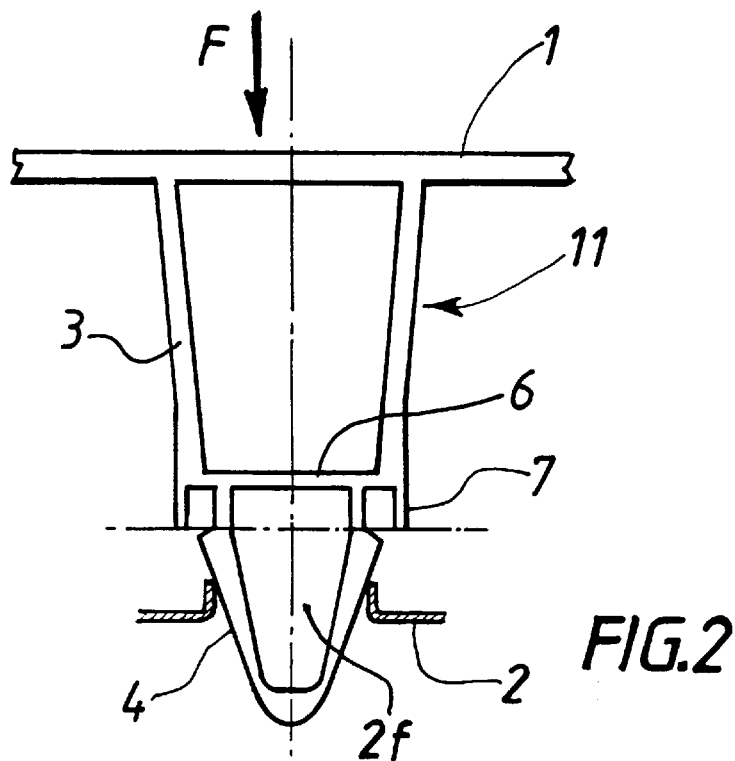
Figure 3:
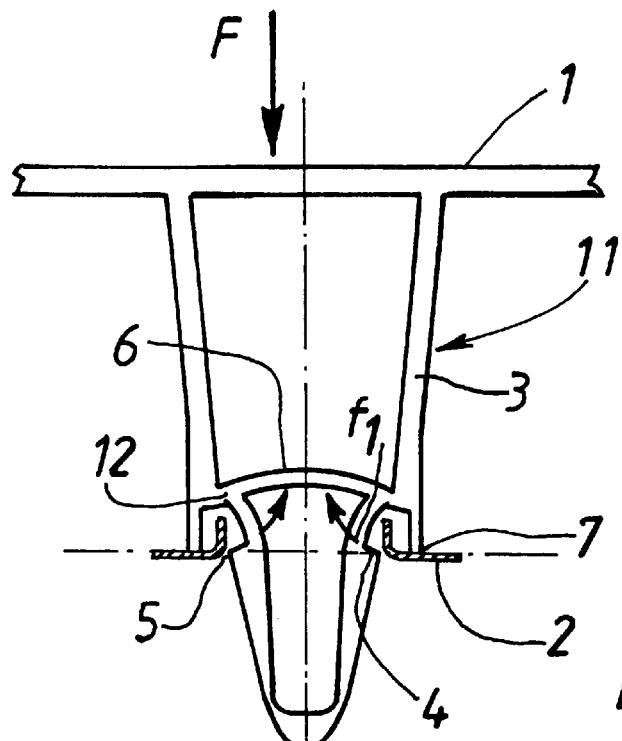

In FIG. 2, the nose 4a has penetrated into the hole 2f and the sides of the nose 4 are in contact with the edges of the metal sheet 2.

Figure 4:
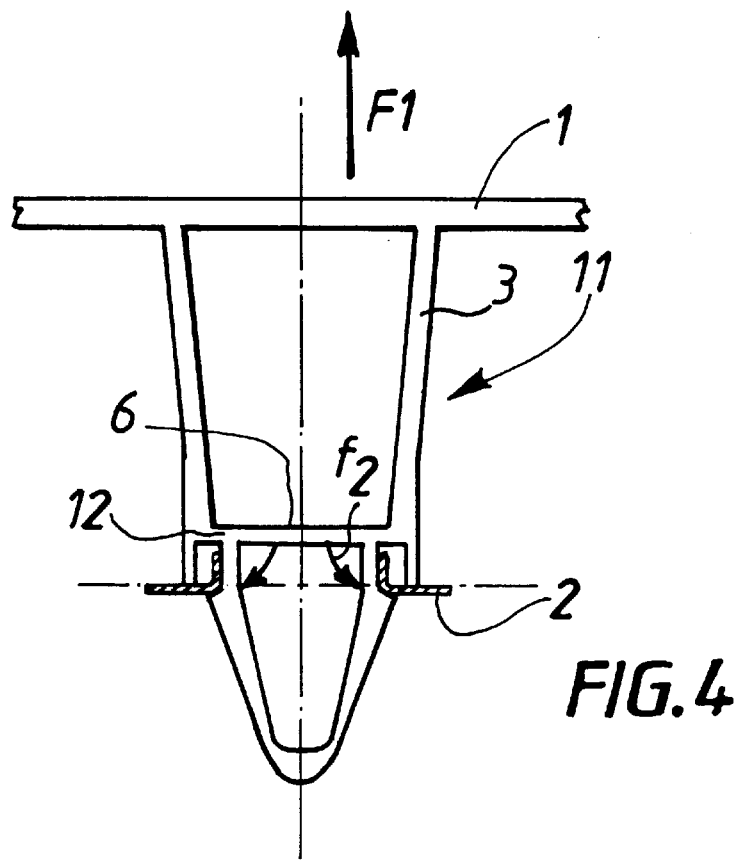

As the movement continues (FIG. 3), the nose 4 penetrates into the hole 2f, with the hole pressing sideways against the two rims 5 of the integrated clip. Under the combined effect of the assembly force and the pressure exerted by the edges of the support 2, as represented by arrows f1, the sides of the nose deform inwards and the cross plate 6 takes up a curved shape, bulging in the opposite direction to arrow F. This gives rise to tilting motion at the center 12 of the junction between the nose 4 and the sides of the body 3, thus tending to reduce the assembly force F. As soon as the abutments 7 of the clip have made contact with the support 2, assembly forces cease to be applied on the nose 4 and it returns to its initial shape by elasticity, thereby holding the support 2 and the tip face of its flange captive between the rim 5 and the abutment 7 of the clip. The clip is held by the contact of the abutment 7 and of the rim 5 on the support 2, as can be seen in FIG. 4, where resistance to extraction is represented by arrow F1. When a traction force F1 is applied to the part, this force is transmitted via the sides 3 of the body, which causes the center 12 to perform a tilting movement that presses the rims 5 against the support 2 thus increasing retention of the clip.

A clipped part 1 is removed in the opposite direction to that described above, i.e. by pulling on the part 1 or on its integrated clip 11, with the integrated clip successively taking up the positions shown in FIGS. 4, 5, 2, and 1, the elasticity of the material serving to return to the configuration shown in FIG. 1 after the nose 4 has been extracted.

Figure 5:
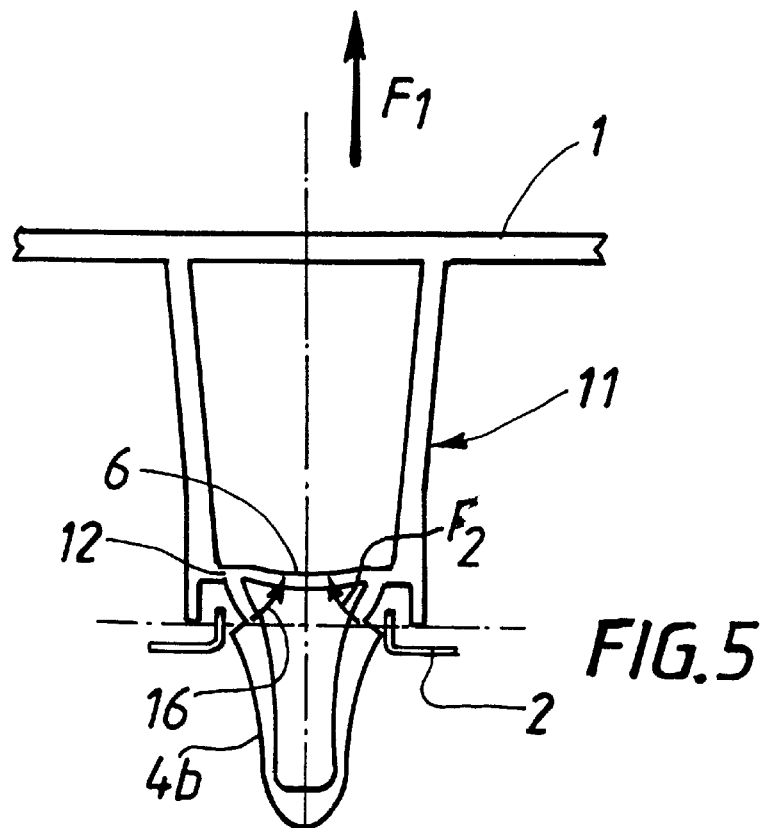
FIG. 5 shows the clip during disassembly.

As shown in FIG. 5, when the extraction force becomes too great, the cross plate 6 curves in the opposite direction to that in which it curved during assembly, as represented by arrows f2, and the sides of the nose 4 deform, thereby releasing the entire clip from the support 2.

Figure 6:
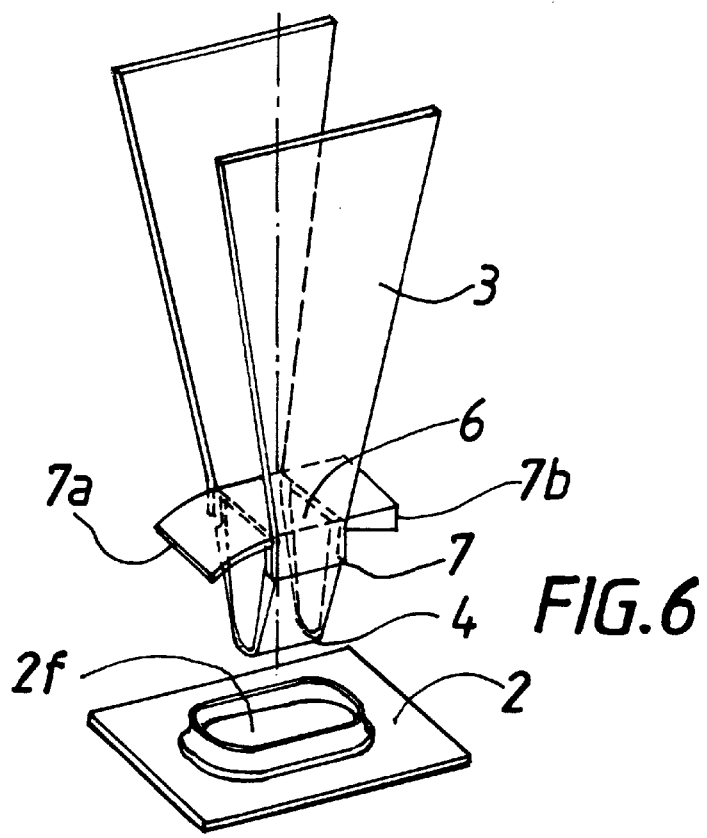
FIG. 6 is a perspective view of an integrated clip of the invention.

FIG. 6 is a perspective view of an integrated clip of the invention, with the part 1 being omitted. The cutout 2f in the support is rectangular and two opposite flexible lips respectively 7a and 7b are provided extending in the longitudinal direction of the cutout and of the integrated clip, the lips extending the cross plate 6 and covering the entire area of the opening 2f, with assembly and disassembly taking place as described above.

Although the above description is given using as an example an integrated clip having two sides for penetrating into a rectangular cutout in a support and having a surrounding flange, the same structure can naturally be used with a clip whose section is square or circular. Similarly, although it is economically advantageous for the clips to be integrated with the part made of plastics material, it is clear that they could be constituted as discrete hidden fastening elements and that numerous variants can be provided, in particular by substituting equivalent technical means, without thereby going beyond the ambit of the invention.

What is claimed is:

1. A clip of plastic material for fixing a part to a support, wherein the clip is integrated in the part and comprises a hollow body terminated at one end by a nose of dimensions that are smaller than the dimensions of the body, wherein the nose projects from a cross plate connected to the body, at least one substantially triangular snap-fastening rim projecting from the nose to define a snap-fastening zone designed to receive an edge of the support by elasticity and to hold the integrated clip on the support.

2. A clip according to claim 1, wherein the body is extended by ribs serving as abutments for the integrated clip against the support.

3. A clip according to claim 1, wherein the body has two trapezoidal sides, the nose being V-shaped with each of its sides having a snap-fastening rim.

4. A clip according to claim 1 wherein the nose includes sides that are attached to the cross plate, wherein the sides of the nose have a maximum width that is smaller than the width of the side portions of the body connected to the cross plate.

5. A clip according to claim 1, wherein the body is of a width that is greater than the width of the nose.

6. A clip according to claim 1, wherein abutments serve to hold the support against each of the at least one snap-fastening rim of the nose.

7. A clip according to claim 1, wherein the cross plate is extended in the axial direction of the clip by two projecting flexible lips, which press against the support and provide sealing.

8. A clip according to claim 1, wherein the clip is an injection-molded thermoplastic part.

* * * * *